(12) United States Patent
Lee et al.

(10) Patent No.: US 12,511,782 B2
(45) Date of Patent: Dec. 30, 2025

(54) METHOD AND APPARATUS FOR ESTIMATING POSES OF MULTIPLE CAMERAS

(71) Applicants: HYUNDAI MOTOR COMPANY, Seoul (KR); KIA CORPORATION, Seoul (KR); DONGGUK UNIVERSITY INDUSTRY-ACADEMIC COOPERATION FOUNDATION, Seoul (KR)

(72) Inventors: Jung Hyun Lee, Seoul (KR); Dong Wook Lee, Seoul (KR); Taek Hyun Ko, Uijeongbu-si (KR)

(73) Assignees: HYUNDAI MOTOR COMPANY, Seoul (KR); KIA CORPORATION, Seoul (KR); DONGGUK UNIVERSITY INDUSTRY-ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/787,404

(22) Filed: Jul. 29, 2024

(65) Prior Publication Data
US 2025/0232470 A1 Jul. 17, 2025

(30) Foreign Application Priority Data
Jan. 12, 2024 (KR) .................. 10-2024-0005460

(51) Int. Cl.
G06T 7/73 (2017.01)
G06T 7/60 (2017.01)
H04N 23/90 (2023.01)

(52) U.S. Cl.
CPC .................. *G06T 7/74* (2017.01); *G06T 7/60* (2013.01); *H04N 23/90* (2023.01); *G06T 2207/30244* (2013.01); *G06T 2207/30261* (2013.01)

(58) Field of Classification Search
CPC . G06T 2207/30244; G06T 7/73; G06T 7/536; G06T 7/60; G06T 7/70;
(Continued)

(56) References Cited

U.S. PATENT DOCUMENTS 9,147,122 B2 * 9/2015 Chao .......................... G06T 7/73
9,174,830 B1 * 11/2015 Bell ..................... G05D 1/0246
(Continued)

FOREIGN PATENT DOCUMENTS

| CN | 116993800 A | * | 11/2023 | ............... G06T 7/55 |
| CN | 114648586 B | * | 1/2025 | ............... G06T 7/13 |

(Continued)

*Primary Examiner* — Masum Billah
(74) *Attorney, Agent, or Firm* — Lempia Summerfield Katz LLC (57) ABSTRACT

A method of estimating poses of multiple cameras mounted on a vehicle includes detecting a vanishing line from each of a first camera and a second camera. The method also includes transmitting first vanishing line information of the first camera to each of the cameras hierarchically connected to the first camera and transmitting second vanishing line information including the vanishing line of the second camera to each of the cameras hierarchically connected to the second camera. The method further includes calculating a difference between the two pieces of vanishing line information in at least one camera that receives both the first vanishing line information and the second vanishing line information. The method further includes obtaining final vanishing line information in which the difference between the two pieces of vanishing line information converges to (Continued)

within a predetermined reference error value, and estimating a pose of each of the multiple cameras.

17 Claims, 8 Drawing Sheets

(58) Field of Classification Search
CPC ... G06T 7/11; G06T 7/13; G06T 2207/30252; G06T 7/62
USPC .......................................................... 348/148
See application file for complete search history.

(56) References Cited

U.S. PATENT DOCUMENTS

| 12,058,306 B1* | 8/2024 | Rabin .................... G06V 20/64 |
| 2014/0104437 A1* | 4/2014 | Chao .................... G01C 21/005 |
| | | 348/E17.002 |
| 2020/0005490 A1* | 1/2020 | Paik .......................... G06T 7/80 |
| 2020/0160561 A1* | 5/2020 | Dai ...................... G06V 20/588 |
| 2023/0368424 A1 | 11/2023 | Lee |

FOREIGN PATENT DOCUMENTS

| JP | 2020064046 A | * | 4/2020 | ............. G08G 1/167 |
| KR | 101549165 B1 | * | 9/2015 | ........... G06V 20/588 |
| KR | 101574020 B1 | * | 12/2015 | ........... H04N 13/246 |
| KR | 20230158335 A | | 11/2023 | |

* cited by examiner

METHOD AND APPARATUS FOR ESTIMATING POSES OF MULTIPLE CAMERAS

CROSS-REFERENCE TO RELATED APPLICATION

This application claims the benefit of and priority to Korean Patent Application No. 10-2024-0005460, filed in the Korean Intellectual Property Office on Jan. 12, 2024, the entire contents of which are hereby incorporated herein by reference.

TECHNICAL FIELD

The present disclosure relates to a technology for estimating poses of multiple cameras, and more specifically, an apparatus and method for estimating poses of multiple cameras based on vanishing line information detected from two cameras among multiple cameras mounted on a vehicle.

BACKGROUND

Various image recognition technologies are typically employed to operate an autonomous vehicle. For example, identifying a lane while driving and identifying a vanishing point are important factors.

A vanishing point is a point where infinite extensions of parallel lines in a three-dimensional space meet on a two-dimensional plane if being projected onto the two-dimensional plane. As an example of utilizing detection of the vanishing point, a building may be reinterpreted by analyzing an architectural structure by obtaining vanishing points and vanishing lines in three orthogonal directions. In 3D transformation of a 2D image including artificial structures, a depth map may be generated by detecting a vanishing point. The reason for this is that estimation of a relative depth is possible because a part where the vanishing point is located generally corresponds to the farthest part in the image as a 3D space is transformed into a 2D image.

In addition, vanishing point information is an important basis for lane detection in autonomous vehicles or location information analysis in autonomous driving systems, such as robots. This is because a road may be detected by connecting major edges connected from the vanishing point.

The vehicle may be equipped with multiple cameras, including, for example, a front camera, a rear camera, a front left camera, a front right camera, a wide-angle front camera, a rear left camera, a rear right camera, a wide-angle rear camera, a wide-angle left camera, and a wide-angle right camera. The vehicle may employ technology to estimate the poses of the multiple cameras.

The conventional technology may estimate the pose of one camera that is out of alignment by monitoring the relationship between three or more cameras. However, there may be a combination of cameras in which the camera-camera relationship is difficult to estimate. Further, pose estimation may be difficult if two or more cameras are out of alignment, and information about the camera-road relationship may be lost as calibration is repeated.

SUMMARY

The present disclosure has been made to solve the above-mentioned problems occurring in the prior art while advantages achieved by the prior art are maintained intact.

Aspects of the present disclosure provide an apparatus and method for estimating poses of multiple cameras mounted on a vehicle. The apparatus and method are capable of estimating the poses of the multiple cameras based on vanishing line information detected from two cameras among the multiple cameras mounted on a vehicle.

Aspects of the present disclosure provide an apparatus and method for estimating poses of multiple cameras. The apparatus and method are capable of estimating the poses of the multiple cameras using a vanishing point of each camera and transmitted vanishing line information by transmitting the matched vanishing line information of a front camera and a rear camera to other cameras hierarchically connected to the front camera and the rear camera.

Aspects of the present disclosure provide an apparatus and method for estimating poses of multiple cameras. The apparatus and method are capable of estimating the poses of the multiple cameras based on received vanishing line information and vanishing points. The apparatus and method are also capable of acquiring translation and/or rotation of each of the multiple cameras based on a geometric relational structure between the multiple cameras to avoid offline calibration of the vehicle.

The technical problems to be solved by the present disclosure are not limited to the aforementioned problems. Other technical problems not mentioned herein should more be clearly understood from the following description by those having ordinary skill in the art to which the present disclosure pertains.

According to an aspect of the present disclosure, an apparatus is provided for estimating poses of multiple cameras mounted on a vehicle. The apparatus includes a memory configured to store computer-executable instructions. The apparatus also includes at least one processor configured to access the memory and execute the instructions. The at least one processor is configured to detect a vanishing line from each of a first and a second camera, among the multiple cameras mounted on the vehicle, capable of detecting the vanishing line. The at least one processor is also configured to transmit first vanishing line information including the vanishing line of the first camera to each of the cameras hierarchically connected to the first camera. The at least one processor is further configured to transmit second vanishing line information including the vanishing line of the second camera to each of the cameras hierarchically connected to the second camera. The at least one processor is further still configured to calculate a difference between the first vanishing line information and the second vanishing line information in at least one camera that receives both the first vanishing line information of the first camera and the second vanishing line information of the second camera. The at least one processor is additionally configured to obtain final vanishing line information in which the difference between the first vanishing line information and the second vanishing line information converges to within a predetermined reference error value. The at least one processor is also configured to estimate a pose of each of the multiple cameras based on vanishing points detected by the multiple cameras and the final vanishing line information.

According to an embodiment, the at least one processor may be configured to re-detect the vanishing line from each of the first camera and the second camera based on the difference between the first vanishing line information and the second vanishing line information when the difference between the first vanishing line information and the second vanishing line information is greater than the predetermined reference error value. The at least one processor may also be configured to recalculate a difference between first recalculated vanishing line information including re-detected vanishing line of the first camera and second recalculated vanishing line information including re-detected vanishing line of the second camera. The at least one processor may additionally be configured to, when the difference between the first recalculated vanishing line information and the second recalculated vanishing line information converges to within the predetermined reference error value, obtain the final vanishing line information.

According to an embodiment, the at least one processor may be configured to re-detect the vanishing line by removing edge points corresponding to outliers based on i) the difference between the first vanishing line information and the second vanishing line information and ii) a previous vanishing line slope.

According to an embodiment, the at least one processor may be configured to acquire translation of each of the multiple cameras based on a geometric relational structure between the multiple cameras and design data including a three-dimensional drawing of the vehicle.

According to an embodiment, the geometric relational structure may be obtained based on included angles between the multiple cameras after orientations between the multiple cameras are obtained through Epipolar geometry and the included angles between the multiple cameras are obtained.

According to an embodiment, the at least one processor may be configured to acquire the translation of each of the multiple cameras by i) scaling the geometric relational structure between the multiple cameras to match the design data including the three-dimensional drawing of the vehicle and ii) fitting the scaled geometric relational structure between the multiple cameras to a rim of the vehicle.

According to an embodiment, the at least one processor may be configured to repeatedly perform a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized, for all of the cameras to acquire the translation of each of the multiple cameras.

According to an embodiment, the at least one processor may be configured to adjust translation such that any one of the cameras overlaps the rim of the vehicle and rotation such that remaining cameras are aligned with the rim of the vehicle, and then perform scaling such that a distance between each of the multiple cameras and the rim of the vehicle is minimized.

According to an embodiment, the multiple cameras may include a front camera, a rear camera, a front left camera, a front right camera, a wide-angle front camera, a rear left camera, a rear right camera, a wide-angle rear camera, a wide-angle left camera, and a wide-angle right camera.

According to an aspect of the present disclosure, a method is provided for estimating poses of multiple cameras mounted on a vehicle. The method includes detecting a vanishing line from each of a first camera and a second camera, among the multiple cameras mounted on the vehicle, capable of detecting the vanishing line. The method also includes transmitting first vanishing line information including the vanishing line of the first camera to each of the cameras hierarchically connected to the first camera. The method further includes transmitting second vanishing line information including the vanishing line of the second camera to each of the cameras hierarchically connected to the second camera. The method further still includes calculating a difference between the first vanishing line information and the second vanishing line information in at least one camera that receives both the first vanishing line information of the first camera and the second vanishing line information of the second camera. The method also includes obtaining final vanishing line information in which the difference between the first vanishing line information and the second vanishing line information converges to within a predetermined reference error value. The method additionally includes estimating a pose of each of the multiple cameras based on vanishing points detected by the multiple cameras and the final vanishing line information.

According to an embodiment, detecting the vanishing line may include re-detecting the vanishing line from each of the first camera and the second camera based on the difference between the first vanishing line information and the second vanishing line information when the difference between the first vanishing line information and the second vanishing line information is greater than the reference error value. Obtaining the final vanishing line information may include recalculating a difference between first re-determined vanishing line information including the re-detected vanishing line of the first camera and second vanishing line information including the re-detected vanishing line of the second camera. Obtaining the final vanishing line information may also include, when the difference between the first recalculated vanishing line information and the second recalculated vanishing line information converges to within the predetermined reference error value, obtaining the final vanishing line information.

According to an embodiment, detecting the vanishing line may include re-detecting the vanishing line by removing edge points corresponding to outliers based on i) the difference between the first vanishing line information and the second vanishing line information and ii) a previous vanishing line slope.

According to an embodiment, the method may further include acquiring translation of each of the multiple cameras based on a geometric relational structure between the multiple cameras and design data including a three-dimensional drawing of the vehicle.

According to an embodiment, the geometric relational structure may be obtained based on included angles between the multiple cameras after orientations between the multiple cameras are obtained through Epipolar geometry and the included angles between the multiple cameras are obtained.

According to an embodiment, acquiring the translation of each of the multiple cameras may include scaling the geometric relational structure between the multiple cameras to match the design data including the three-dimensional drawing of the vehicle. Acquiring the translation of each of the multiple cameras may also include fitting the scaled geometric relational structure between the multiple cameras to a rim of the vehicle.

According to an embodiment, acquiring the translation of each of the multiple cameras may include repeatedly performing a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized, for all of the cameras to acquire the translation of each of the multiple cameras.

According to an embodiment, acquiring the translation of each of the multiple cameras may include adjusting translation such that any one of the cameras overlaps the rim of the vehicle and rotation such that remaining cameras are aligned with the rim of the vehicle. Acquiring the translation of each of the multiple cameras may also include performing scaling such that a distance between each of the multiple cameras and the rim of the vehicle is minimized.

BRIEF DESCRIPTION OF THE DRAWINGS

The above and other objects, features, and advantages of the present disclosure should be more apparent from the following detailed description taken in conjunction with the accompanying drawings, in which.

DETAILED DESCRIPTION

Hereinafter, with reference to the accompanying drawings, embodiments of the present disclosure are described in detail to enable those having ordinary skill in the art to readily carry out the present disclosure. However, the present disclosure may be embodied in several different forms. The present disclosure is not limited to the embodiments described herein.

In describing the embodiments of the present disclosure, where it was determined that a detailed description of a known configuration or a function may obscure the gist of the present disclosure, a detailed description thereof has been omitted. In the accompanying drawings, parts not related to the description are omitted. Like reference numerals refer to like elements throughout the drawings and the specification.

In the present disclosure, if an element is referred to as being "connected to", "coupled to", or "combined with" another element, the element may be directly connected or coupled to the other element, may be combined with the other element, or one or more intervening elements may be present between the element and the other element. Terms such as "comprise", "include" or "have", when used in the present disclosure, specify the presence of stated elements. Such terms do not preclude the presence or addition of one or more other elements.

In the present disclosure, terms such as first and second are used only for the purpose of distinguishing one element from other elements. Such terms do not limit the order or importance of the elements unless specifically mentioned. Therefore, within the scope of the present disclosure, a first element in one embodiment may be referred to as a second element in another embodiment. Similarly, the second element in one embodiment may be referred to as the first element in another embodiment.

In the present disclosure, distinct elements are only for clearly describing their features and do not mean that the elements are necessarily separated. For example, a plurality of elements may be integrated to form a single hardware or software unit, or a single element may be distributed to form a plurality of hardware or software units. Accordingly, such integrated or distributed embodiments are included in the scope of the present disclosure, even if not otherwise noted.

In the present disclosure, elements described in the various embodiments are not necessarily essential elements. Some elements may be optional. Accordingly, embodiments including a subset of the elements described in one embodiment are also included in the scope of the present disclosure. Furthermore, embodiments including other elements in addition to the elements described in the various embodiments are also within the scope of this disclosure.

In the present disclosure, expressions of positional relationships, such as top, bottom, left, or right, used in the specification are described for convenience of description. It should be understood if an accompanying drawing is viewed in reverse, the positional relationships described in the specification may also be interpreted in the opposite way.

In the present disclosure, each of the phrases "A or B," "at least one of A and B," "at least one of A or B," "A, B or C," "at least one of A, B and C," and "at least one of A, B, or C" may include any one of items listed along with a relevant phrase, or any possible combination thereof.

When a component, device, element, or the like of the present disclosure is described as having a purpose or performing an operation, function, or the like, the component, device, or element should be considered herein as being "configured to" meet that purpose or perform that operation or function.

To estimate a pose of each of multiple cameras mounted on a vehicle, embodiments of the present disclosure may detect a vanishing line using at least two cameras capable of detecting the vanishing line and may repeatedly perform a process of detecting the vanishing line such that two pieces of vanishing line information match each other or a difference between the two pieces of vanishing line information is minimized. Embodiments of the present disclosure may transmit the vanishing line information to each of the other cameras to estimate a pose of each of the multiple cameras based on the vanishing line information and the vanishing points detected by the multiple cameras. According to embodiments of the present disclosure, a pose of a camera may include a position and an orientation of the camera.

Embodiments of the present disclosure may obtain a geometric relational structure between the multiple cameras through the Epipolar geometry Embodiments of the present disclosure may also obtain the translation and/or rotation of each of the multiple cameras based on the geometric relational structure between the multiple cameras and design data including the three-dimensional drawing of a vehicle.

Embodiments of the present disclosure may acquire the translation of each of the multiple cameras by i) scaling a geometric relational structure between the multiple cameras to match design data including a three-dimensional drawing of a vehicle and ii) fitting the scaled geometric relational structure between the multiple cameras to a rim of the vehicle.

For example, embodiments of the present disclosure may repeatedly perform a process of i) adjusting the rotation such that any one of the cameras is aligned with the rim of the vehicle in the scaled geometric relational structure between the multiple cameras and ii) performing scaling such that a distance between each of the multiple cameras and the rim of the vehicle is minimized for all of the cameras to acquire the translation of each of the multiple cameras.

The multiple cameras in embodiments of the present disclosure may refer to cameras mounted on a vehicle and may include a front camera, a rear camera, a front left camera, a front right camera, a wide-angle front camera, a rear left camera, a rear right camera, a wide-angle rear camera, a wide-angle left camera, and a wide-angle right camera. Of course, the multiple cameras are not limited or restricted to the cameras described above and may include any camera capable of being mounted on the vehicle.

A method and an apparatus for estimating poses of multiple cameras according to embodiments of the present disclosure are described in more detail below with reference to FIGS. 1-7.

Figure 1:
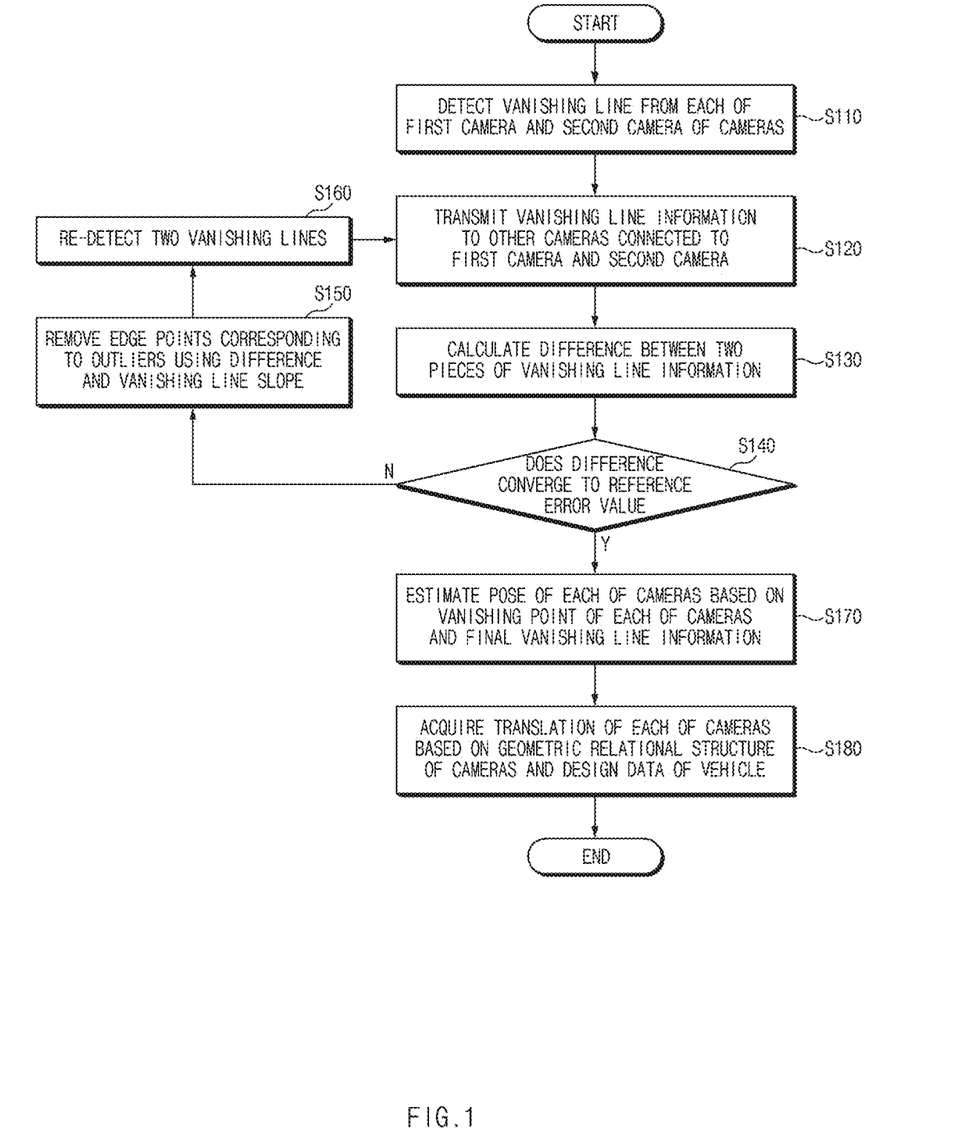
FIG. 1 illustrates a flowchart of a method of estimating poses of multiple cameras, according to an embodiment of the present disclosure.

FIG. 1 is an operational flowchart of a method for estimating poses of multiple cameras, according to an embodiment of the present disclosure. FIG. 1 illustrates an operational flowchart of a method for estimating a pose of each of multiple cameras mounted on a vehicle.

In an operation S110, a vanishing line may be detected in each of a first camera (e.g., a front-L4 camera) and a second camera (e.g., a rear-L4 camera) of multiple cameras mounted on a vehicle where a vanishing line is detectable.

For example, if the cameras mounted on the vehicle include a front camera, a rear camera, a front left camera, a front right camera, a wide-angle front camera, a rear left camera, a rear right camera, a wide-angle rear camera, a wide-angle left camera, and a wide-angle right camera, the vanishing line may be detected in the front camera (e.g., the front-L4 camera) and the rear camera (e.g., the rear-L4 camera) due to a field of view related to ego-lane. Hereinafter, for illustrative purposes, vanishing lines are described as being detected by the front-L4 camera and the rear-L4 camera.

Further, each of the multiple cameras may acquire a vanishing point based on image information acquired from each of the cameras. Here, each of the cameras may acquire the vanishing point using any method capable of acquiring a vanishing point from an image. For example, each of the cameras may detect the vanishing point in straight-line driving as a focus of expansion (FOE) by establishing a region of interest, such as a static object region, from the image, extracting optical flow in the static object region, and estimating an FOE through the intersection of the extracted optical flow vectors.

Figure 2:
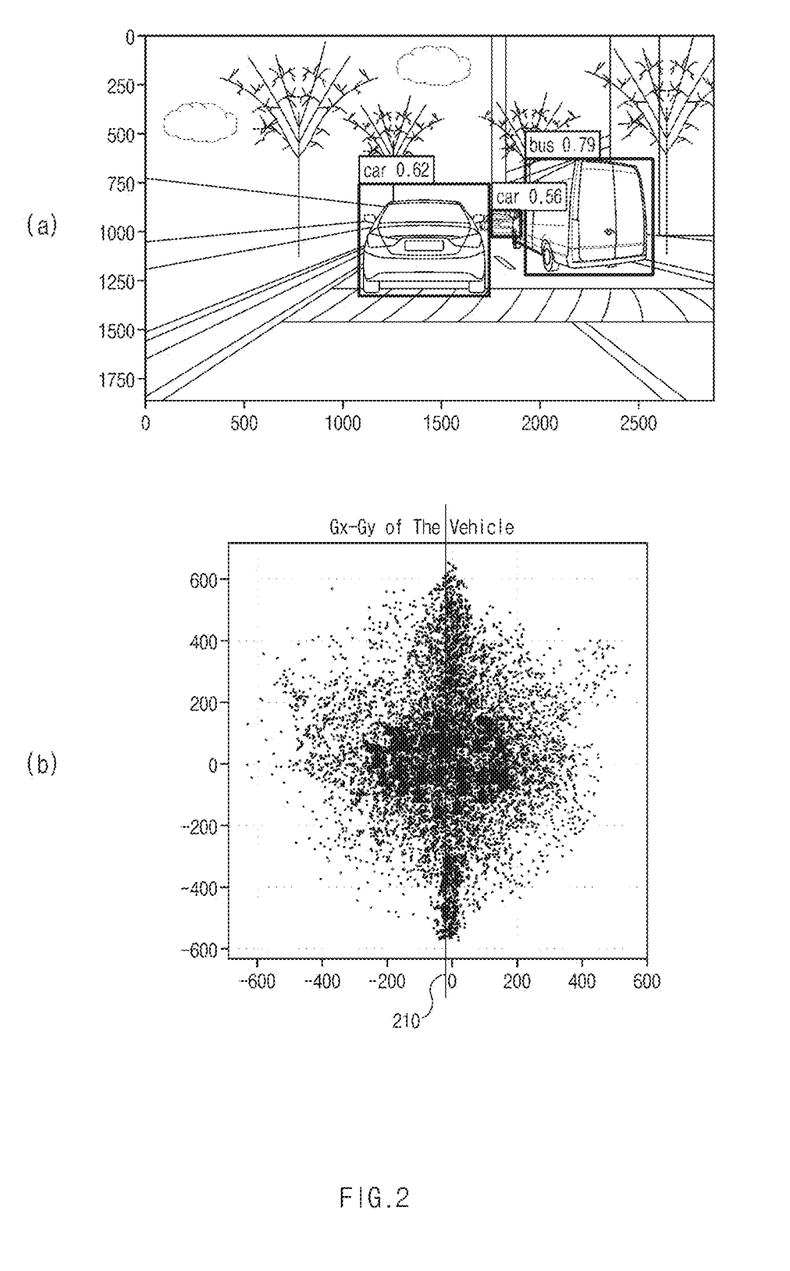
FIG. 2 illustrates example diagrams for describing a method of detecting a vanishing line, according to an embodiment of the present disclosure.

According to an embodiment, in the operation S110, if an image as shown (a) in FIG. 2 is captured by the front-L4 camera while the vehicle is driving, a vehicle included in the image may be detected and an edge point for the vehicle in an ego-lane may be detected. Thereafter, a vanishing line 210 of the front-L4 camera may be detected by estimating horizontal and vertical components as shown in (b) FIG. 2 through principal component analysis (PCA). A method of detecting the vanishing line of the front-L4 camera or the rear-L4 camera in the operation S110 is not limited or restricted to the method described above, Rather, any method capable of detecting a vanishing line from an image may be applied.

In embodiment, the method according to an embodiment of the present disclosure may apply both a vanishing point detection method and a vanishing line detection method. The method may thus estimate the pose of each of the multiple cameras using the vanishing points and vanishing lines detected as described.

If the vanishing lines of the front-L4 camera and the rear-L4 camera are detected in the operation S110, vanishing line information including the vanishing lines of the front-L4 camera and the rear-L4 camera may, in an operation S120, be transmitted to each of the other cameras hierarchically connected to the front-L4 camera and the rear-L4 camera. For example, first vanishing line information including the vanishing line of the front-L4 camera may be transmitted to each of the other cameras hierarchically connected to the front-L4 camera. Further, second vanishing line information including the vanishing line of the rear-L4 camera may be transmitted to each of the other cameras hierarchically connected to the rear-L4 camera.

Figure 3:
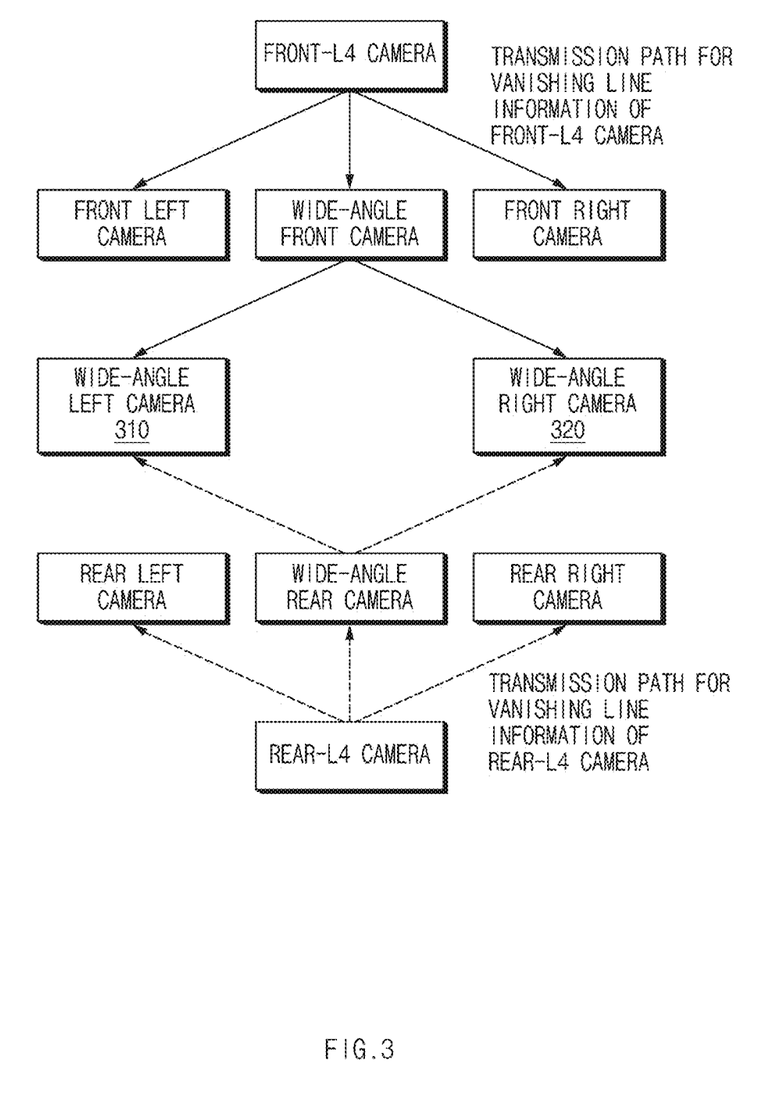
FIG. 3 illustrates an example diagram for describing a path for transmitting vanishing line information, according to an embodiment of the present disclosure.

For example, as shown in FIG. 3, in the operation S120, the vanishing line information of the front-L4 camera may be transmitted to the front-left camera, the wide-angle front camera, the front-right camera, a wide-angle left camera 310, and a wide-angle right camera 320 that are hierarchically connected to the front-L4 camera. Further, the vanishing line information of the rear-L4 camera may be transmitted to the rear-left camera, the wide-angle rear camera, the rear-right camera, the wide-angle left camera 310, and the wide-angle right camera 320 that are hierarchically connected to the rear-L4 camera. The wide-angle left camera 310 and the wide-angle right camera 320 may receive the vanishing line information of the front-L4 camera via the wide-angle front camera and the vanishing line information of the rear-L4 camera via the wide-angle rear camera.

If the vanishing line information of the front-L4 camera and the rear-L4 camera is transmitted to each of the other cameras in the operation S120, at least one camera receiving the two pieces of vanishing line information (e.g., the first vanishing line information including the vanishing line of the front-L4 camera and the second vanishing line information including the vanishing line of the rear-L4 camera), for example, at least one of the wide-angle left camera 310 and the wide-angle right camera 320 of FIG. 3, may, in an operation S130, calculate a difference ($\alpha$) between the two pieces of vanishing line information. In an operation S140, the at least one camera may determine whether the calculated difference between the two pieces of vanishing line information converges to within a predetermined reference error value.

Here, the reference error value may be a preset very small difference value to obtain final vanishing line information or may be a value of '0' indicating that the two pieces of vanishing line information are identical. It should be noted that the reference error value may be determined by a business operator or individual providing the technology of the present disclosure.

If, as a result of determination in the operation S140, the difference between the two pieces of vanishing line information does not converge to the reference error value, edge points corresponding to outliers may be removed in an operation S150 using the difference between the two pieces of vanishing line information and vanishing line slopes and thereafter. In an operation S160, vanishing lines of the front-L4 camera and the rear-L4 camera may be re-detected.

For example, in the operation S150, the edge points corresponding to the outlier may be removed by removing remaining edge points except edge points between a vanishing line slope +α and a vanishing line slope −α which are shown in (b) in FIG. 2. Accordingly, in the operation S160, the front-L4 camera may re-detect the vanishing line information of the front-L4 camera by removing the remaining edge points except the edge points between the previous vanishing line slope to and the previous vanishing line slope −α of the front-L4 camera. Further, in the operation S160, the rear-L4 camera may re-detect the vanishing line information of the rear-L4 camera by removing the remaining edge points except the edge points between the previous vanishing line slope +α and the previous vanishing line slope −α of the rear-L4 camera.

If the vanishing line information of the front-L4 camera and the rear-L4 camera is re-detected by the process of the operations S150 and S160, the re-detected vanishing line information of the front-L4 camera and the rear-L4 camera may, in the operation S120, be transmitted to each of the other cameras hierarchically connected to the front-L4 camera and the rear-L4 camera, respectively. In the operation S130, at least one of the wide-angle left camera 310 and the wide-angle right camera 320 may recalculate the difference (α) between the two pieces of vanishing line information. In the operation S140, the at least one of the wide-angle left camera 310 and the wide-angle right camera 320 may determine whether the calculated difference between the two pieces of vanishing line information converges within to the reference error value. The process including operations S120, S30 and S140 may be repeated until the difference between the two pieces of vanishing line information converges to within the reference error value.

According to an embodiment, if the difference between the two pieces of vanishing line information converges to within the reference error value, this may mean that the difference between the two pieces of vanishing line information approaches '0', which may mean that the two pieces of vanishing line information are identical. The above-described vanishing line information may be referred to as the final vanishing line information. In other words, if the difference between the two pieces of vanishing line information converges to within the reference error value close to '0', the vanishing line information may be the final vanishing line information.

The process of obtaining the final vanishing line information, according to an embodiment, is described in more detail below with reference to FIG. 4.

Figure 4:
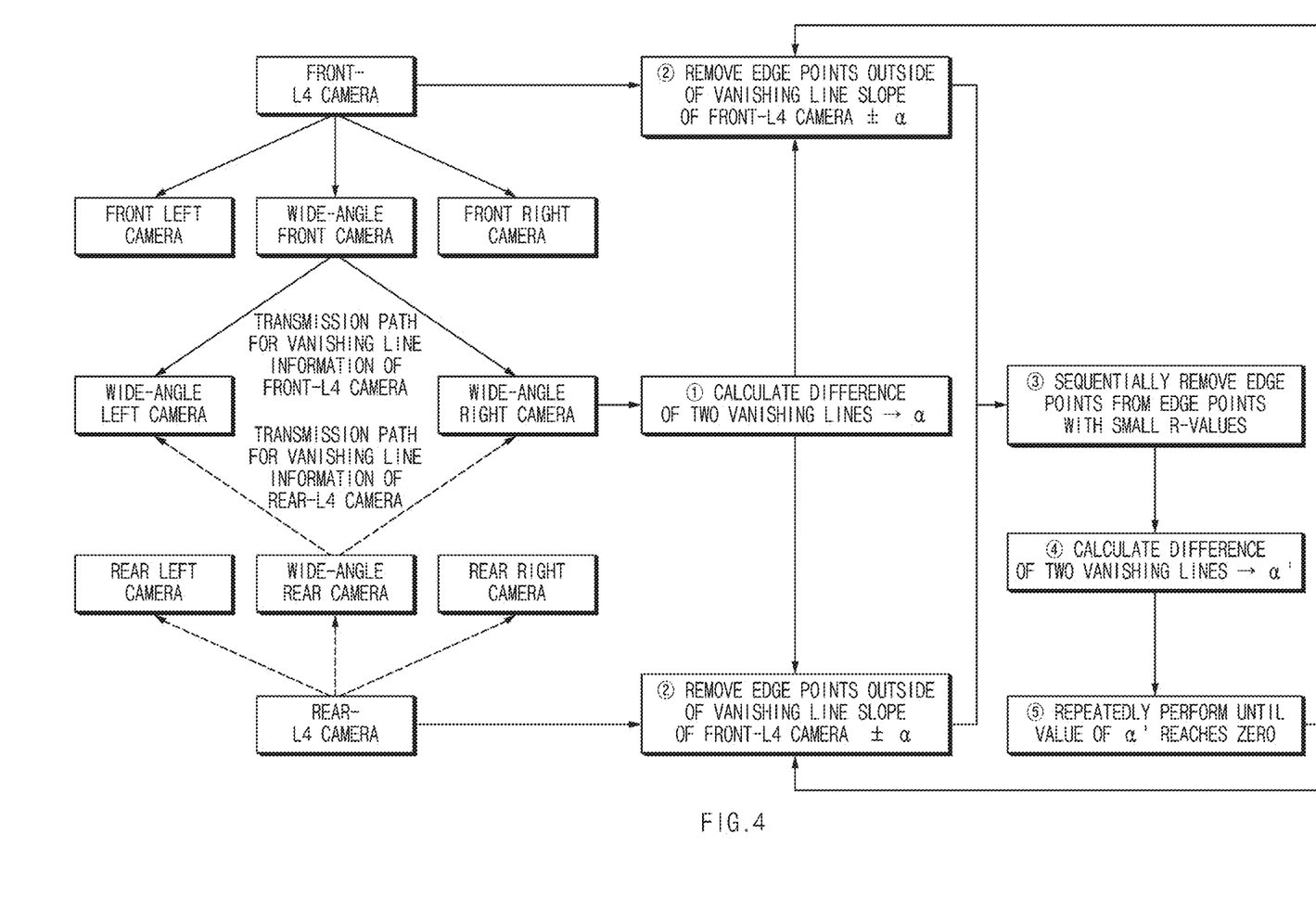
FIG. 4 illustrates an example diagram for describing a process of acquiring final vanishing line information, according to an embodiment of the present disclosure.

FIG. 4 is a diagram for describing a process of obtaining the final vanishing line information, assuming that a wide-angle right camera calculates a difference between two pieces of vanishing line information, according to an embodiment.

As illustrated in FIG. 4, the process of obtaining the final vanishing line information may include calculating, by a wide-angle right camera, a difference (α) between the vanishing line information of a front-L4 camera and the vanishing line information of a rear-L4 camera when the vanishing line information of the front-L4 camera and the vanishing line information of the rear-L4 camera are received via a vanishing line transmission path in an operation ①.

When the difference (α) between the two pieces of vanishing line information is calculated by the wide-angle right camera, the difference (α) between the two pieces of vanishing line information may be transmitted to the front-L4 camera and the rear-L4 camera. The front-L4 camera and the rear-L4 camera may remove edge points corresponding to outliers by removing edge points other than the edge points between a vanishing line slope +α and a vanishing line slope −α, sequentially from edge points with small r-values, and then re-detect the vanishing line information of the front-L4 camera and the vanishing line information of the rear-L4 camera in operations ② and ③.

When the vanishing line information of the front-L4 camera and the rear-L4 camera is re-detected, the difference (α") between the two pieces of re-detected vanishing line information may be recalculated in an operation ④.

The process of operations ②-④ may be repeated until the difference (α') between the two pieces of re-detected vanishing line information is close to '0', i.e., converges to within a reference error value in an operation ⑤.

If the difference (α') value of the two pieces of vanishing line information converges to within the reference error value through the process, the vanishing line information of the front-L4 camera and the rear-L4 camera may be obtained as the final vanishing line information.

Referring again to FIG. 1, when the final vanishing line information is obtained through the process described above, the pose of each of the cameras may be estimated in an operation S170 based on the vanishing point and the final vanishing line information of each of the cameras.

When the pose of each of the cameras is estimated in the operation S170, the translation and/or rotation of each of the cameras may be obtained in an operation S180 based on the geometric relational structure between the cameras and the design data of the vehicle.

According to an embodiment, the geometric relational structure between the cameras may be obtained based on included angles between the multiple cameras after orientations between the multiple cameras are obtained through the Epipolar geometry and the included angles between the multiple cameras are obtained.

According to an embodiment, in the operation S180, the translation of each of the multiple cameras may be acquired by i) scaling a geometric relational structure between the multiple cameras to match design data including a three-dimensional drawing of a vehicle and ii) fitting the scaled geometric relational structure between the multiple cameras to a rim of the vehicle.

According to an embodiment, in the operation S180, a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized may be performed repeatedly for all of the cameras to acquire the translation of each of the multiple cameras.

According to an embodiment, in the operation S180, a process of i) adjusting translation such that any one of the cameras overlaps the rim of the vehicle, ii) adjusting the rotation such that the remaining cameras are aligned with the rim of the vehicle, and iii) performing scaling such that a distance between each of the multiple cameras and the rim of the vehicle is minimized may be performed repeatedly for all of the cameras to acquire the translation of each of the multiple cameras.

Figure 5:
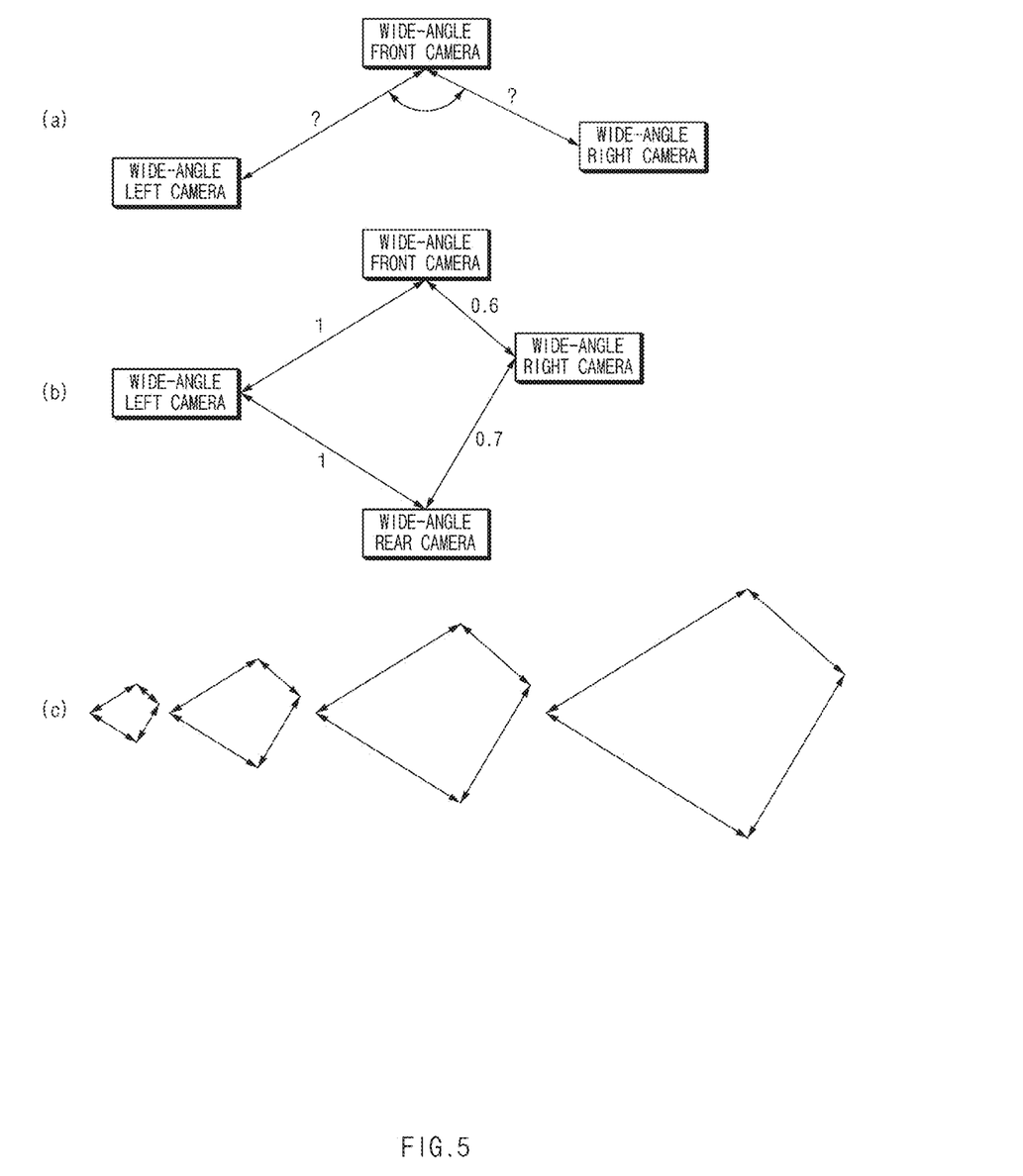
FIG. 5 illustrates example diagrams for describing geometric relational structure between cameras, according to an embodiment of the present disclosure.

The process performed in the operation S180, according to an embodiment, is described in more detail with reference to FIGS. 5 and 6. In FIG. 5, a wide-angle front camera, a wide-angle left camera, a wide-angle right camera, and a wide-angle rear camera are shown as examples of cameras.

As shown (a) in FIG. 5, the wide-angle front camera may know in which direction the wide-angle right camera and the wide-angle left camera are located and know their included angles, according to the Epipolar geometry, although the wide-angle front camera does not know their length.

In this way, the included angles of all cameras may be known, and a square as shown in (b) in FIG. 5 may be acquired through the included corner angles of the wide-angle front camera, wide-angle right camera, wide-angle left camera, and wide-angle rear camera. Because the orientations of the right and left cameras with respect to the reference camera, e.g., the front-L4 camera are known, the included corner angle of each of the cameras with respect to a reference camera may be acquired.

In the square shown in (b) in FIG. 5, the distances between the cameras may be unknown, but the ratio of the distances between the cameras may be known. For example, the ratio of the distance between the wide-angle front camera and the wide-angle left camera, the distance between the wide-angle front camera and the wide-angle right camera, the distance between the wide-angle left camera and the wide-angle rear camera, and the distance between the wide-angle rear camera and the wide-angle right camera may be 1:0.6:1:0.7.

Because the distance ratio between the cameras is known from the square according to the orientations of the cameras, but the area and size of the square is unknown, it may be hard to know which of the squares formed by the four wide-angle cameras has the actual area as in the examples of the squares formed by the four wide-angle cameras shown in (c) in FIG. 5. Therefore, the geometric relational structure between the cameras may be acquired by finding the scale value between the cameras and adjusting the scale value.

In embodiments, the geometric relational structure between the cameras is the relational structure formed by the included corner angles of the cameras, which may mean the structure shown in (b) in FIG. 5 formed by four wide-angle cameras.

To find a scale value between the cameras in the geometric relational structure between the cameras, the scale value between the cameras in the geometric relational structure between the cameras may be acquired by adjusting the scale value between the cameras in the geometric relational structure such that the geometric relational structure between the cameras matches design data including a three-dimensional drawing of a corresponding vehicle.

Figure 6:
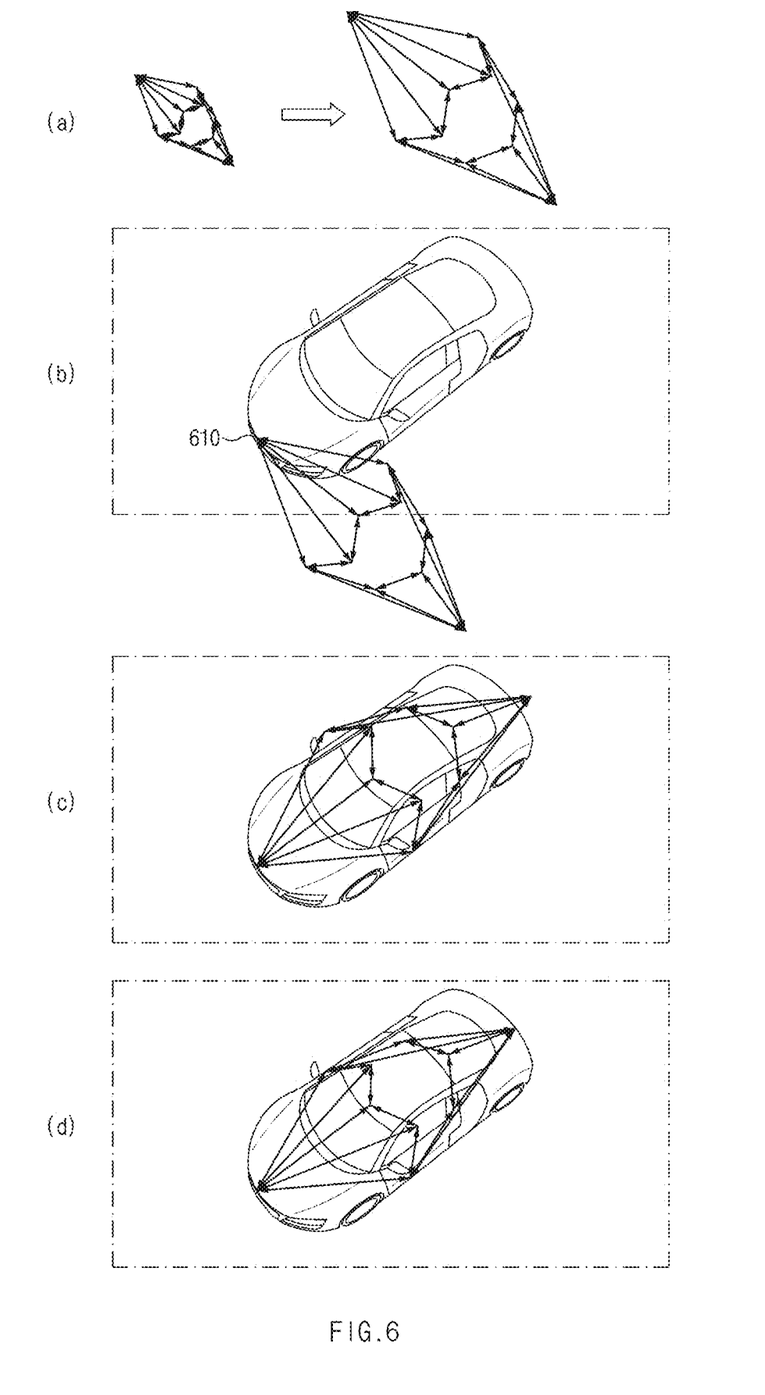
FIG. 6 illustrates example diagrams for describing a process of acquiring translation of each of cameras, according to an embodiment of the present disclosure.

For example, a method according to an embodiment of the present disclosure may include scaling the geometric relational structure such that the volume of the geometric relational structure between the multiple cameras, in which only the ratio between the cameras is known as shown in (a) in FIG. 6, is the same as that of the design data of the actual vehicle, to obtain the translation of each of the multiple cameras.

Then, as shown in (b) in FIG. 6, translation may be adjusted such that one of the multiple cameras, for example, a wide-angle front camera 610 overlaps at a position corresponding to the design value (or design data) of the wide-angle front camera of the actual vehicle.

Then, as shown in (c) FIG. 6, the rotation may be adjusted such that the remaining cameras are aligned with the vehicle rim of the design data of the actual vehicle. It may be seen from (c) in FIG. 6 that the geometric relational structure between the rotation-adjusted cameras deviates from the rim of the actual vehicle.

To this end, the method according to an embodiment of the present disclosure may include performing scaling such that the distance between each camera and the vehicle rim is minimized, as shown in (d) in FIG. 6.

The process illustrated in (b)-(d) of FIG. 6 may be performed repeatedly for all cameras until no scaling is required, thereby acquiring the translation and/or rotation of each of the cameras.

Accordingly, in embodiments, the process of obtaining the translation of each of the cameras may include: scaling the geometric relational structure between the cameras to match the actual design data of the vehicle; adjusting the translation of one camera such that the camera overlaps the design data and then adjusting the rotation of the remaining cameras such that the remaining cameras are aligned with the vehicle rim of the design data; performing scaling such that the distance between each camera and the vehicle rim of the design data is minimized; and repeating the above-described processes for all cameras until convergence to preset conditions.

As described above, the method of estimating poses of multiple cameras according to embodiments of the present disclosure may estimate poses of multiple cameras based on vanishing line information detected from two of the cameras mounted on the vehicle.

Further, the method of estimating poses of multiple cameras according to embodiments of the present disclosure may estimate the poses of the multiple cameras using the vanishing point of each camera and the transmitted vanishing line information by transmitting the matched vanishing line information of the front camera and the rear camera to other cameras hierarchically connected to the front camera and the rear camera.

Further, the method of estimating poses of multiple cameras according to embodiments of the present disclosure may estimate the poses of the multiple cameras based on the received vanishing line information and vanishing points and may acquire the translation and/or rotation of each of the multiple cameras based on the geometric relational structure between the multiple cameras to omit offline calibration of the vehicle, thereby reducing the cost and time spent on calibration. In other words, according to the method of estimating poses of multiple cameras according to embodiments of the present disclosure, it may be possible to perform automatic calibration without the need to perform pre-calibration after the vehicle has leaved the factory.

Figure 7:
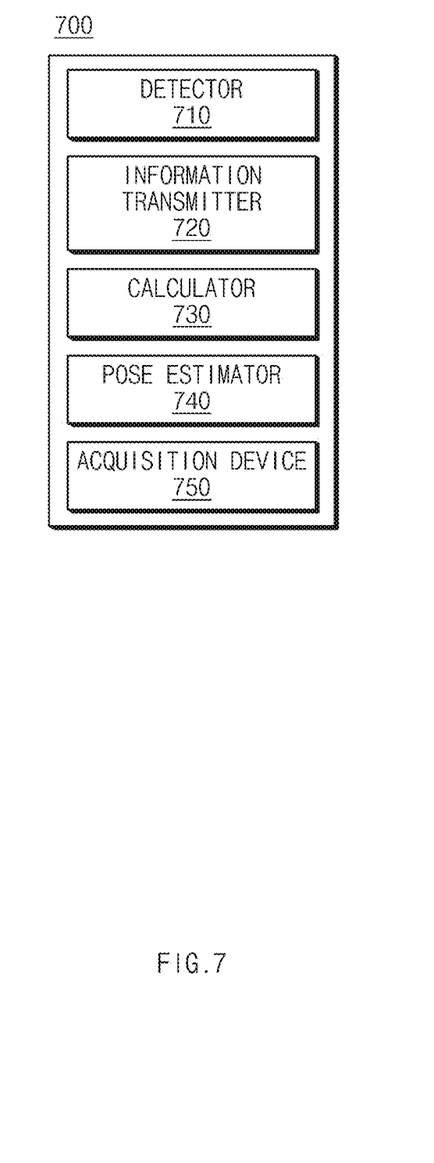
FIG. 7 illustrates a configuration of an apparatus for estimating poses of multiple cameras according to another embodiment of the present disclosure, according to an embodiment of the present disclosure.

FIG. 7 illustrates a configuration for an apparatus for estimating poses of multiple cameras according to another embodiment of the present disclosure. FIG. 7 is a block diagram of a configuration of a device that may perform the methods of FIGS. 1-6, according to an embodiment.

Referring to FIG. 7, an apparatus 700 for estimating poses of multiple cameras, according to an embodiment of the present disclosure, may include a detector 710, an information transmitter 720, a calculator 730, a pose estimator 740, and an acquisition device 750.

The detector 710 may detect a vanishing line in each of a first camera (e.g., a front-L4 camera) and a second camera (e.g., a rear-L4 camera) of multiple cameras mounted on a vehicle where a vanishing line is detectable.

In an embodiment, the detector 710 may detect a vanishing point based on image information from each of the cameras.

According to an embodiment, the detector 710 may re-detect a vanishing line in each of the first camera and the second camera based on a difference between two pieces of vanishing line information if the difference between the two pieces of vanishing line information is greater than the reference error value.

According to an embodiment, the detector 710 may re-detect a vanishing line by removing edge points corresponding to outliers based on the difference between the two pieces of vanishing line information and a previous vanishing line slope.

The detector 710 may detect a vanishing point and a vanishing line by using various methods or schemes. The present disclosure is not limited or restricted to the method of detecting vanishing points and vanishing lines described herein.

The information transmitter 720 may transmit vanishing line information including the vanishing line of the first camera to each of the cameras hierarchically connected to the first camera. The information transmitter 720 may also transmit vanishing line information including the vanishing line of the second camera to each of the cameras hierarchically connected to the second camera.

The calculator 730 may calculate a difference between the vanishing line information from the first camera and the vanishing line information from the second camera in at least one camera receiving the two pieces of vanishing line information together.

The pose estimator 740 may obtain final vanishing line information in which the difference between the two pieces of vanishing line information converges to within a predetermined reference error value. The pose estimator 740 may estimate a pose of each of the multiple cameras based on vanishing points detected in the multiple cameras and the final vanishing line information.

According to an embodiment, the pose estimator 740 may recalculate a difference between two pieces of vanishing line information including the re-detected vanishing line. The pose estimator 740 may obtain final vanishing line information if the difference between the two pieces of recalculated vanishing line information converges to within the reference error value.

The acquisition device 750 may acquire the translation of each of the multiple cameras based on the design data including the geometric relational structure between the multiple cameras and the three-dimensional drawing of a vehicle.

The geometric relational structure between the multiple cameras may be obtained based on included angles between the multiple cameras after orientations between the multiple cameras are obtained through the Epipolar geometry and the included angles between the multiple cameras are obtained.

According to an embodiment, the acquisition device 750 may acquire the translation of each of the multiple cameras by i) scaling the geometric relational structure between the multiple cameras to match design data including the three-dimensional drawing of the vehicle and ii) fitting the scaled geometric relational structure between the multiple cameras to the rim of the vehicle.

According to an embodiment, the acquisition device 750 may repeatedly perform a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized for all of the cameras to acquire the translation of each of the multiple cameras.

According to an embodiment, the acquisition device 750 may adjust the translation such that any one of the cameras overlaps the rim of the vehicle. The acquisition device 750 may also adjust the rotation such that the remaining cameras are aligned with the rim of the vehicle. The acquisition device 750 may perform scaling such that a distance between each of the multiple cameras and the rim of the vehicle is minimized.

In various embodiments, even if a description with reference to the apparatus 700 of FIG. 7 is omitted, the apparatus 700 may include and/or be configured to perform all of the contents and/or operations described with reference the FIGS. 1-6, as should be apparent to those having ordinary skill in the art.

Figure 8:
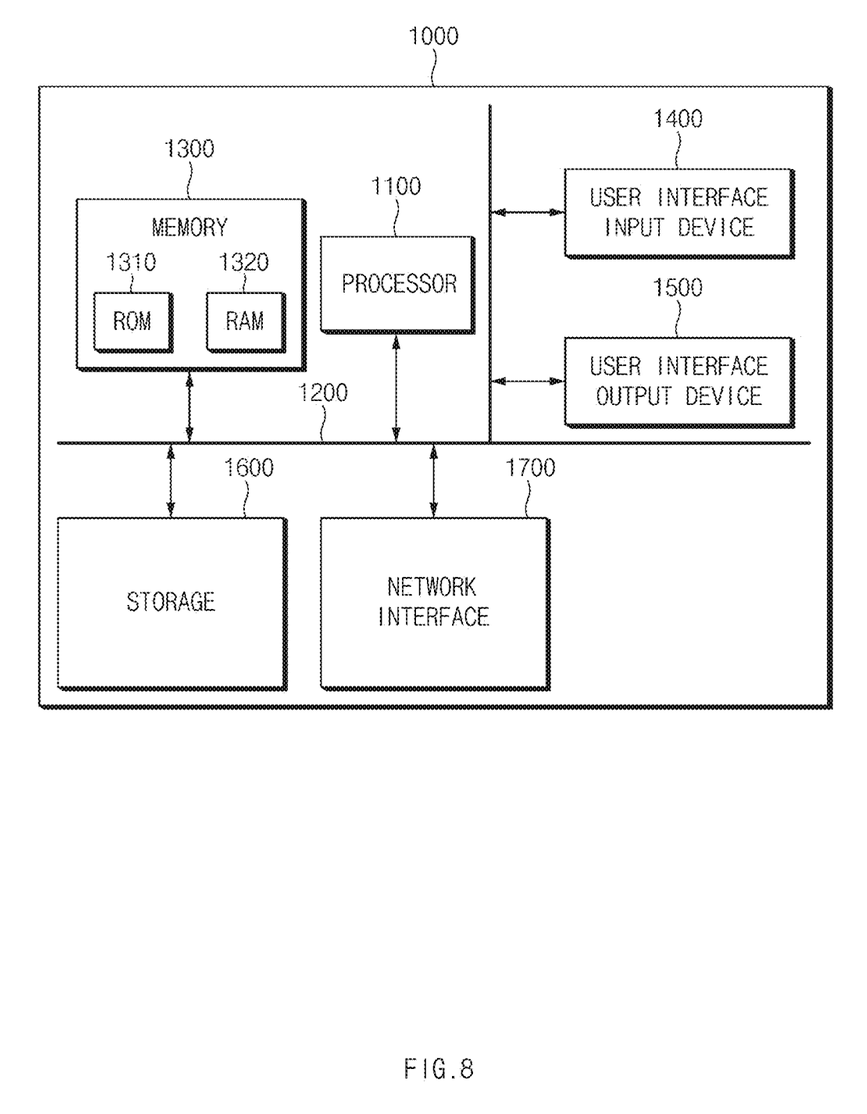
FIG. 8 illustrates a block diagram of a computing system for executing a method of estimating poses of multiple cameras, according to an embodiment of the present disclosure.

FIG. 8 illustrates a block diagram of a computing system for executing a method of estimating poses of multiple cameras, according to an embodiment of the present disclosure.

Referring to FIG. 8, the method of estimating poses of multiple cameras according to the embodiment of the present disclosure may be implemented through a computing system 1000. The computing system 1000 may include at least one processor 1100, a memory 1300, a user interface input device 1400, a user interface output device 1500, storage 1600, and a network interface 1700, which are connected with each other via a system bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments of the present disclosure may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM. The storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. Alternatively, the processor 1100 and the storage medium may reside in the user terminal as separate components.

The embodiments described herein may be implemented with hardware components and software components and/or a combination of the hardware components and the software components. For example, the apparatus, method, and components according to embodiments may be implemented using one or more general-purpose or special purpose computers, such as a processor, a controller, an arithmetic logic unit (ALU), a digital signal processor, a microcomputer, a field programmable array (FPGA), a programmable logic unit (PLU), a microprocessor, or any other device capable of executing and responding to instructions. The processing device may run an operating system (OS) and one or more software applications that run on the OS. The processing device also may access, store, manipulate, process, and create data in response to execution of the software. For convenience of understanding, one processing device is described as being used. However, those having ordinary skill in the art should appreciate that the processing device may include a plurality of processing elements and/or multiple types of processing elements. For example, the processing device may include multiple processors or a single processor and a single controller. In addition, different processing configurations such as a parallel processor are possible.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In an embodiment, the software and data may be stored by one or more computer readable recording mediums.

The above-described methods may be embodied in the form of program instructions that may be executed by various computer means and recorded on a computer-readable medium. The computer readable medium may include program instructions, data files, data structures, and the like, alone or in combination. Program instructions recorded on the media may be those specially designed and constructed for the purposes of the inventive concept, or they may be of the kind well-known and available to those having ordinary skill in the computer software arts. Examples of computer readable recording media include magnetic media such as hard disks, floppy disks and magnetic tape, optical media such as CD-ROMS, DVDs, and magnetic disks such as floppy disks, Magneto-optical media, and hardware devices specifically configured to store and execute program instructions, such as ROM, RAM, flash memory, and the like. Examples of program instructions include not only machine code generated by a compiler, but also high-level language code that may be executed by a computer using an interpreter or the like. The hardware device described above may be configured to operate as one or more software modules to perform the operations of the present disclosure, and vice versa.

Although the technical concepts of the present disclosure have been described with reference to the example embodiments and the accompanying drawings, it should be understood that various modifications and variations may be made by those having ordinary skill in the art from the above description. For example, the described techniques may be performed in a different order than the described method and/or components of the described systems, structures, devices, circuits, etc. may be combined or combined in a different form than the described method, or other components, or even if replaced or substituted by equivalents, an appropriate result may be achieved.

The above description is merely illustrative of the technical idea of the present disclosure, and various modifications and variations may be made without departing from the essential characteristics of the present disclosure by those having ordinary skill in the art to which the present disclosure pertains. Accordingly, the embodiments disclosed in the present disclosure are not intended to limit the technical idea of the present disclosure but to describe the present disclosure. The scope of the technical idea of the present disclosure is not limited by the embodiment. The scope of protection of the present disclosure should be interpreted by the following claims and all technical ideas within the scope equivalent thereto should be construed as being included in the scope of the present disclosure.

According to embodiments of the present disclosure, it is possible to estimate poses of multiple cameras based on vanishing line information detected from two of the cameras mounted on the vehicle.

Further, according to embodiments of the present disclosure, it is possible to estimate the poses of the multiple cameras using the vanishing point of each camera and the transmitted vanishing line information by transmitting the matched vanishing line information of the front camera and the rear camera to other cameras hierarchically connected to the front camera and the rear camera.

Further, according to embodiments of the present disclosure, it is possible to estimate the poses of the multiple cameras based on the received vanishing line information and vanishing points, and acquire the translation and/or rotation of each of the multiple cameras based on the geometric relational structure between the multiple cameras to omit offline calibration of the vehicle, thereby reducing the cost and time spent on calibration.

The effects obtainable in the present disclosure are not limited to the aforementioned effects. Other effects not mentioned herein should be clearly understood from the description above by those having ordinary skill in the art to which the present disclosure pertains.

Hereinabove, although the present disclosure has been described with reference to example embodiments and the accompanying drawings, the present disclosure is not limited thereto. The present disclosure may be variously modified and altered by those having ordinary skill in the art to which the present disclosure pertains without departing from the spirit and scope of the present disclosure claimed in the following claims.

What is claimed is:

1. An apparatus for estimating poses of multiple cameras mounted on a vehicle, the apparatus comprising:
   a memory configured to store computer-executable instructions; and
   at least one processor configured to access the memory and execute the computer-executable instructions,
   wherein the at least one processor is configured to
   detect a vanishing line from each of a first camera and a second camera, among the multiple cameras mounted on the vehicle, capable of detecting the vanishing line,
   transmit first vanishing line information including the vanishing line of the first camera to each of the cameras hierarchically connected to the first camera,
   transmit second vanishing line information including the vanishing line of the second camera to each of the cameras hierarchically connected to the second camera,
   calculate a difference between the first vanishing line information and the second vanishing line information in at least one camera that receives both the first vanishing line information of the first camera and the second vanishing line information of the second camera,
   obtain final vanishing line information in which the difference between the first vanishing line information and the second vanishing line information converges to within a predetermined reference error value, and
   estimate a pose of each of the multiple cameras based on vanishing points detected by the multiple cameras and the final vanishing line information.

2. The apparatus of claim 1, wherein the at least one processor is configured to:

re-detect the vanishing line from each of the first camera and the second camera based on the difference between the first vanishing line information and the second vanishing line information when the difference between the first vanishing line information and the second vanishing line information is greater than the predetermined reference error value;

recalculate a difference between first recalculated vanishing line information including re-detected vanishing line of the first camera and second recalculated vanishing line information including re-detected vanishing line of the second camera; and when the difference between the first recalculated vanishing line information and the second recalculated vanishing line information converges to within the predetermine reference error value, obtain the final vanishing line information.

3. The apparatus of claim 2, wherein the at least one processor is configured to re-detect the vanishing line by removing edge points corresponding to outliers based on i) the difference between the first vanishing line information and the second vanishing line information and ii) a previous vanishing line slope.

4. The apparatus of claim 1, wherein the at least one processor is configured to acquire translation of each of the multiple cameras based on a geometric relational structure between the multiple cameras and design data including a three-dimensional drawing of the vehicle.

5. The apparatus of claim 4, wherein the geometric relational structure is obtained based on included angles between the multiple cameras after orientations between the multiple cameras are obtained through Epipolar geometry and the included angles between the multiple cameras are obtained.

6. The apparatus of claim 5, wherein the at least one processor is configured to acquire the translation of each of the multiple cameras by i) scaling the geometric relational structure between the multiple cameras to match the design data including the three-dimensional drawing of the vehicle and ii) fitting the scaled geometric relational structure between the multiple cameras to a rim of the vehicle.

7. The apparatus of claim 6, wherein the at least one processor is configured to repeatedly perform a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized, for all of the cameras to acquire the translation of each of the multiple cameras.

8. The apparatus of claim 7, wherein the at least one processor is configured to:
adjust translation such that any one of the cameras overlaps the rim of the vehicle and rotation such that remaining cameras are aligned with the rim of the vehicle; and
perform scaling such that a distance between each of the multiple cameras and the rim of the vehicle is minimized.

9. The apparatus of claim 1, wherein the multiple cameras include a front camera, a rear camera, a front left camera, a front right camera, a wide-angle front camera, a rear left camera, a rear right camera, a wide-angle rear camera, a wide-angle left camera, and a wide-angle right camera.

10. A method of estimating poses of multiple cameras mounted on a vehicle, the method comprising:

detecting a vanishing line from each of a first camera and a second camera, among the multiple cameras mounted on the vehicle, capable of detecting the vanishing line;
transmitting first vanishing line information including the vanishing line of the first camera to each of the cameras hierarchically connected to the first camera;
transmitting second vanishing line information including the vanishing line of the second camera to each of the cameras hierarchically connected to the second camera;
calculating a difference between the first vanishing line information and the second vanishing line information in at least one camera that receives both the first vanishing line information of the first camera and the second vanishing line information of the second camera;
obtaining final vanishing line information in which the difference between the first vanishing line information and the second vanishing line information converges to within a predetermined reference error value; and
estimating a pose of each of the multiple cameras based on vanishing points detected by the multiple cameras and the final vanishing line information.

11. The method of claim 10, wherein:
detecting the vanishing line includes re-detecting the vanishing line from each of the first camera and the second camera based on the difference between the first vanishing line information and the second vanishing line information when the difference between the first vanishing line information and the second vanishing line information is greater than the predetermined reference error value; and
obtaining the final vanishing line information includes
recalculating a difference between first re-determined vanishing line information including the re-detected vanishing line of the first camera and second vanishing line information including the re-detected vanishing line of the second camera, and
when the difference between the of the first recalculated vanishing line information and the second recalculated vanishing line information converges to within the predetermine reference error value, obtaining the final vanishing line information.

12. The method of claim 11, wherein re-detecting the vanishing line includes re-detecting the vanishing line by removing edge points corresponding to outliers based on i) the difference between the first vanishing line information and the second vanishing line information and ii) a previous vanishing line slope.

13. The method of claim 10, further comprising acquiring translation of each of the multiple cameras based on a geometric relational structure between the multiple cameras and design data including a three-dimensional drawing of the vehicle.

14. The method of claim 13, wherein the geometric relational structure is obtained based on included angles between the multiple cameras after orientations between the multiple cameras are obtained through Epipolar geometry and the included angles between the multiple cameras are obtained.

15. The method of claim 14, wherein acquiring the translation of each of the multiple cameras includes i) acquiring the translation of each of the multiple cameras by scaling the geometric relational structure between the multiple cameras to match the design data including the three-dimensional drawing of the vehicle and ii) fitting the scaled geometric relational structure between the multiple cameras to a rim of the vehicle.

16. The method of claim 15, wherein acquiring the translation of each of the multiple cameras includes repeatedly performing a process of i) adjusting translation such that any one of the cameras overlaps the rim of the vehicle in the scaled geometric relational structure between the multiple cameras and ii) performing scaling such that a distance between each of the multiple cameras and the rim of the vehicle is minimized, for all of the multiple cameras to acquire the translation of each of the multiple cameras.

17. The method of claim 16, wherein acquiring the translation of each of the multiple cameras includes:
 adjusting translation such that any one of the cameras overlaps the rim of the vehicle and rotation such that remaining cameras are aligned with the rim of the vehicle; and
 performing scaling such that a distance between each of the multiple cameras and the rim of the vehicle is minimized.

\* \* \* \* \*